UNITED STATES PATENT OFFICE.

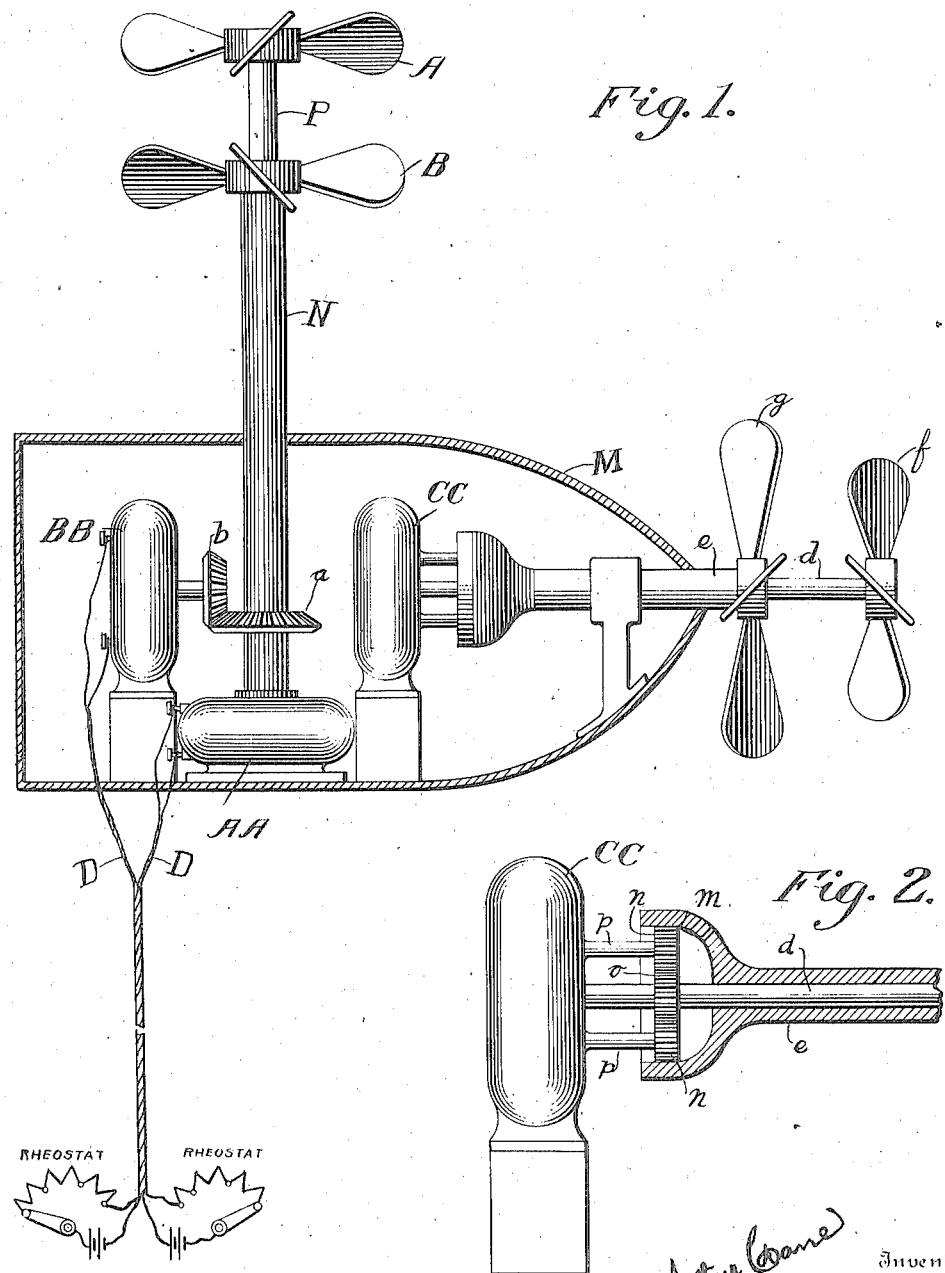

ARTHUR CRANE, OF BERKELEY, CALIFORNIA.

AIRSHIP.

947,802.

Specification of Letters Patent.  Patented Feb. 1, 1910.

Application filed June 1, 1909. Serial No. 499,472.

*To all whom it may concern:*

Be it known that I, ARTHUR CRANE, a citizen of the United States, residing at No. 2937 King street, Berkeley, in the county of Alameda, State of California, have invented a new and useful Airship, of which the following is a specification.

My invention relates to improvements in the construction of airships in which control can be exercised over the craft by means of the combination of two or more separate and independent engines or motors; and the objects of my improvements are, firstly, to guide or steer the craft through the air; and, second to enable the craft to be operated from the earth by means of sending the power or fuel to the several engines or motors, either through flexible steam pipes, electric wires or fuel pipes. I attain these objects by the mechanism illustrated in the accompanying drawing, in which—

Figure 1 is a vertical elevation of the mechanism of the airship showing a section of the frame or shell; Fig. 2 is a section of the inside gear of that portion of the mechanism marked "CC" on Fig. 1.

In the drawing M represents a section of the car or shell of the air ship. Mounted on suitable supports within the shells are three motors, AA, BB and CC, which may be of any desired type suitable for the purpose. Projecting vertically through an opening in the upper part of the shell and turning therein is a hollow shaft N carrying a screw propeller B at its upper end and being provided near its lower end with a bevel gear $a$ meshing with a bevel gear $b$ fixed to the shaft of motor BB whereby said motor drives propeller B. Within the said hollow shaft N is a second shaft P projecting beyond shaft N at both the upper and lower ends thereof, and carrying at its upper end a screw propeller A similar to propeller B; the lower end of shaft P is directly connected to the shaft of motor AA whereby the latter drives propeller A. The relative direction of rotation of the two motors is such that the propellers A and B rotate in opposite directions.

DD are flexible connections leading to the earth for controlling the motors AA and BB and may be adapted for conveying any suitable motive fluid to the motors, being indicated in the drawing as electric conductors.

At the front of the air ship and projecting through the shell thereof are concentric shafts $d$ and $e$ carrying propellers $f$ and $g$. Said shafts $d$ and $e$ are driven by motor CC, and are operatively connected for rotation in opposite directions by any suitable gearing as for example by the device illustrated in the drawing, in which $o$ is a gear fixed to shaft $d$ which latter is directly connected to the shaft of motor CC, $n$, $n$ are intermediate gears mounted upon fixed supports $p$ $p$, said gears $n$ $n$ meshing with gear $o$, and $m$ is an annular gear fixed to shaft $e$ and also meshing with gears $n$ $n$.

The method of control, whether exercised on board the airship or from the earth is to increase the power on rotary fans A and B to ascend, decrease it to descend, increase the proportionate power on the rotary fan turning toward the right, to turn the airship toward the left; and to increase the proportionate power on the rotary fan turning toward the left to turn the airship toward the right.

I am aware that prior to my inventions rotary fans have been used to experiment with in connection with airships. I therefore do not claim the helicopter principle broadly; but

I claim:

1. In a flying machine, superimposed lifting propellers, separate motors arranged for driving the same in opposite directions and means for independently controlling the motors, thereby permitting the steering of the machine without the use of a rudder.

2. In a flying machine, superposed lifting propellers, separate motors for driving the same in opposite directions and flexible fluid conductors connecting with the earth for independently controlling the motors, thereby permitting the steering of the machine without the use of a rudder.

3. In a flying machine, in combination, a rotating lifting propeller mounted upon a vertical shaft, a second rotating propeller located below the first propeller and mounted upon a hollow shaft inclosing the first named shaft, gears fixed upon the lower ends of each of said shafts and separate
5 motive mechanism operatively connected to said gears for driving said propellers in opposite directions, whereby the relative speed of said propellers may be varied to steer the machine without the use of a rudder.

ARTHUR CRANE.

Witnesses:
    Jos. F. COLLINS,
    W. P. ACKER.